(12) United States Patent
Kim et al.

(10) Patent No.: US 11,131,501 B2
(45) Date of Patent: Sep. 28, 2021

(54) REFRIGERATOR

(71) Applicant: LG Electronics Inc., Seoul (KR)

(72) Inventors: Narae Kim, Seoul (KR); Sanggyu Kim, Seoul (KR); Hongyoon Jung, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/498,229

(22) PCT Filed: May 18, 2018

(86) PCT No.: PCT/KR2018/005733
§ 371 (c)(1),
(2) Date: Sep. 26, 2019

(87) PCT Pub. No.: WO2018/230850
PCT Pub. Date: Dec. 20, 2018

(65) Prior Publication Data
US 2020/0116425 A1    Apr. 16, 2020

(30) Foreign Application Priority Data
Jun. 14, 2017 (KR) .......................... 10-2017-0074562

(51) Int. Cl.
*F25D 29/00* (2006.01)
*F25D 25/02* (2006.01)
(Continued)

(52) U.S. Cl.
CPC ......... *F25D 29/005* (2013.01); *F25D 25/005* (2013.01); *F25D 25/025* (2013.01);
(Continued)

(58) Field of Classification Search
CPC ...... F25D 29/00; F25D 29/005; F25D 25/005; F25D 25/025; F25D 2400/02; F25D 2400/36; F25D 2500/06; F25D 2700/00
See application file for complete search history.

(56) References Cited

U.S. PATENT DOCUMENTS

2011/0314849 A1   12/2011   Park et al.
2013/0307698 A1*  11/2013   Park ...................... G08C 17/02
                                                              340/815.4

FOREIGN PATENT DOCUMENTS

DE     29912346      12/1999
EP      2418444       2/2012
(Continued)

OTHER PUBLICATIONS

Extended European Search Report in European Application No. 18818165.5, dated Oct. 27, 2020, 9 pages.
(Continued)

*Primary Examiner* — Andrew M Roersma
(74) *Attorney, Agent, or Firm* — Fish & Richardson P.C.

(57) ABSTRACT

A refrigerator includes a cabinet that defines a storage compartment, food storage containers configured to be received in the storage compartment and disposed vertically above a bottom surface of the storage compartment, sensor units each of which is disposed at a lower surface of one of the food storage containers, antenna units disposed at the bottom surface of the storage compartment, where each of the antenna units corresponds to one of the sensor units, and a reader unit configured to receive signals transmitted from the antenna units. The bottom surface of the storage compartment partitions a lower portion of the storage compartment, and the sensor units include a salinity sensor configured to measure a salinity inside of the food storage containers and transmit the salinity to one or more of the antenna units.

20 Claims, 5 Drawing Sheets

(51) Int. Cl.
    *F25D 25/00*     (2006.01)
    *H04W 4/38*      (2018.01)
(52) U.S. Cl.
    CPC .......... *F25D 29/00* (2013.01); *F25D 2400/02* (2013.01); *F25D 2400/36* (2013.01); *F25D 2500/06* (2013.01); *F25D 2700/00* (2013.01); *H04W 4/38* (2018.02)

(56) References Cited

FOREIGN PATENT DOCUMENTS

| | | |
|---|---|---|
| JP | 2011027275 | 2/2011 |
| KR | 200159469 | 10/1999 |
| KR | 100654804 | 12/2006 |
| KR | 100654804 B1 * | 12/2006 |
| KR | 100664490 | 1/2007 |
| KR | 100755144 B1 * | 9/2007 |
| KR | 100788159 | 12/2007 |
| KR | 1020080076065 | 8/2008 |
| KR | 100878822 | 1/2009 |
| KR | 100878822 B1 * | 1/2009 |
| KR | 1020110139844 | 12/2011 |
| KR | 1020120015129 | 2/2012 |

OTHER PUBLICATIONS

PCT International Search Report and Written Opinion in International Application No. PCT/KR2018/005733, dated Sep. 18, 2018, 14 pages.

KR Office Action in Korean Appln. No. 10-2017-0074562, dated May 24, 2021, 13 pages (with English translation).

* cited by examiner

[Fig. 1]
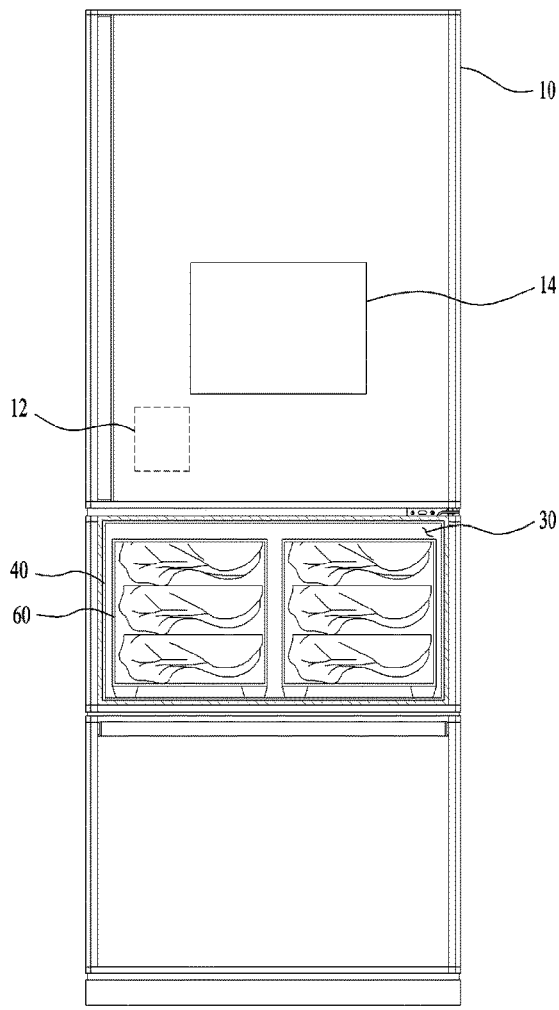
[Fig. 2]
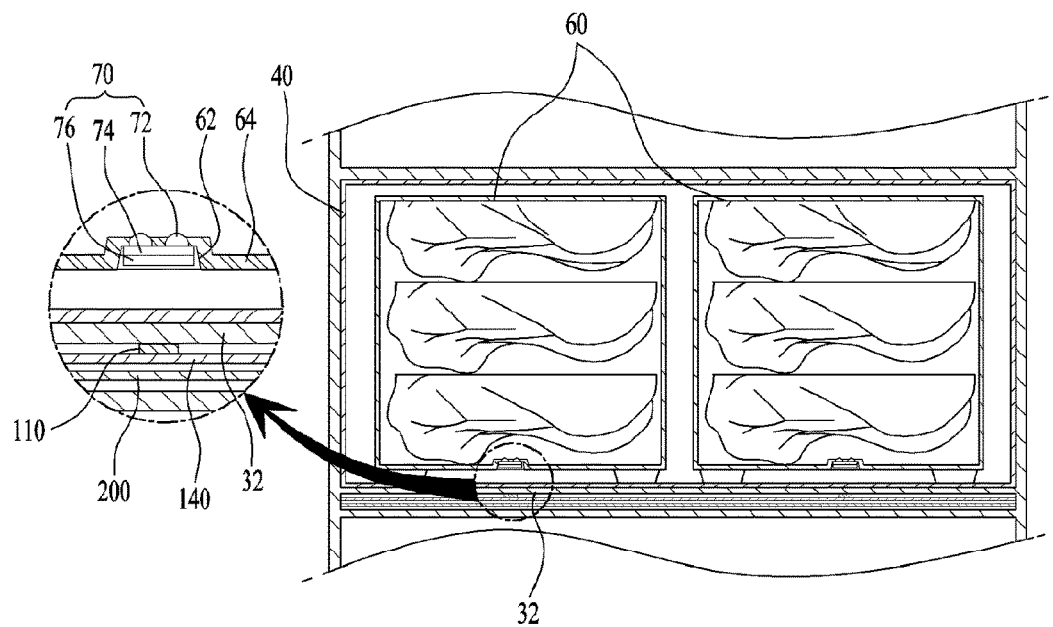

[Fig. 3]
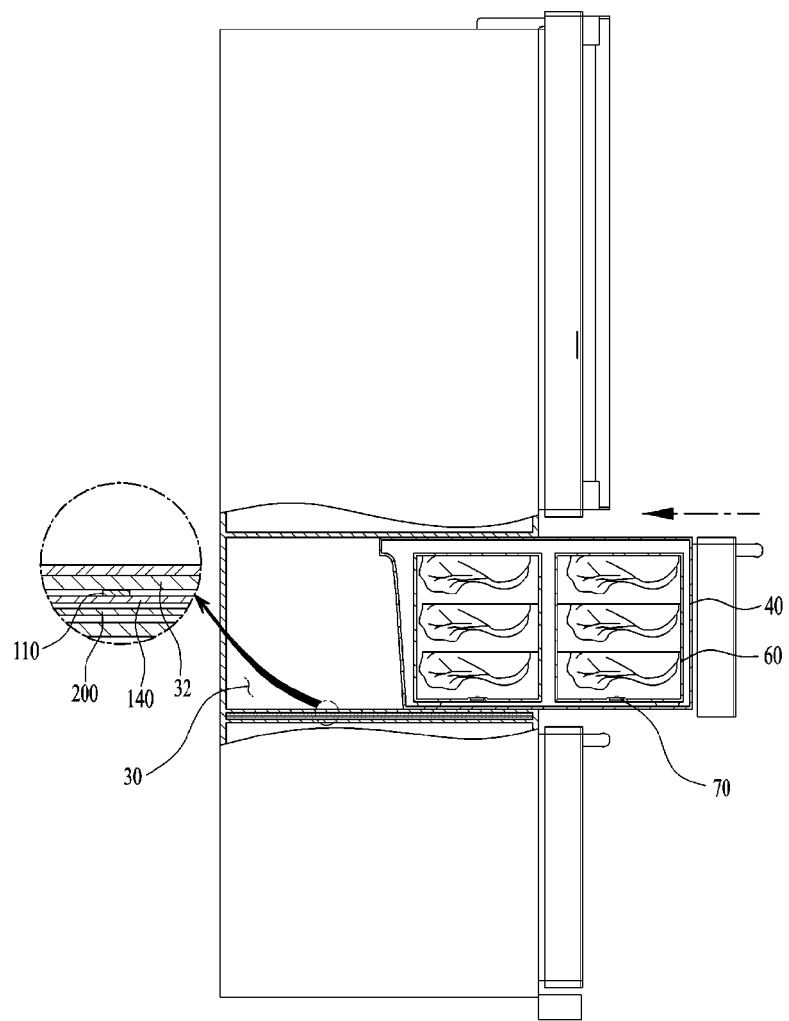

[Fig. 4]
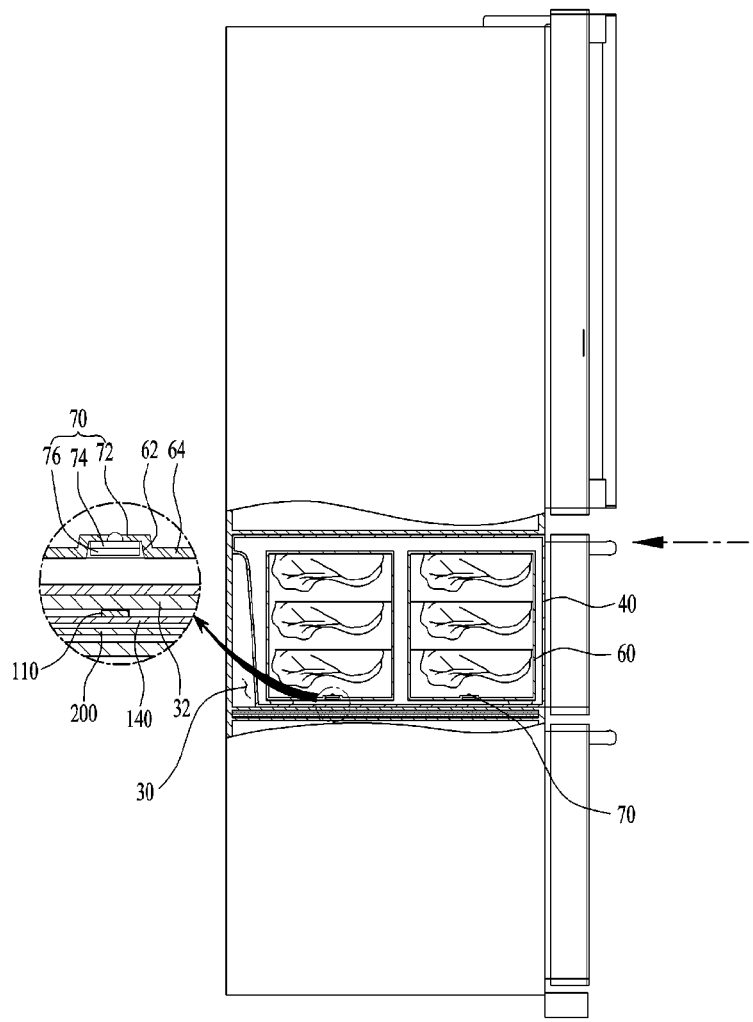
[Fig. 5]
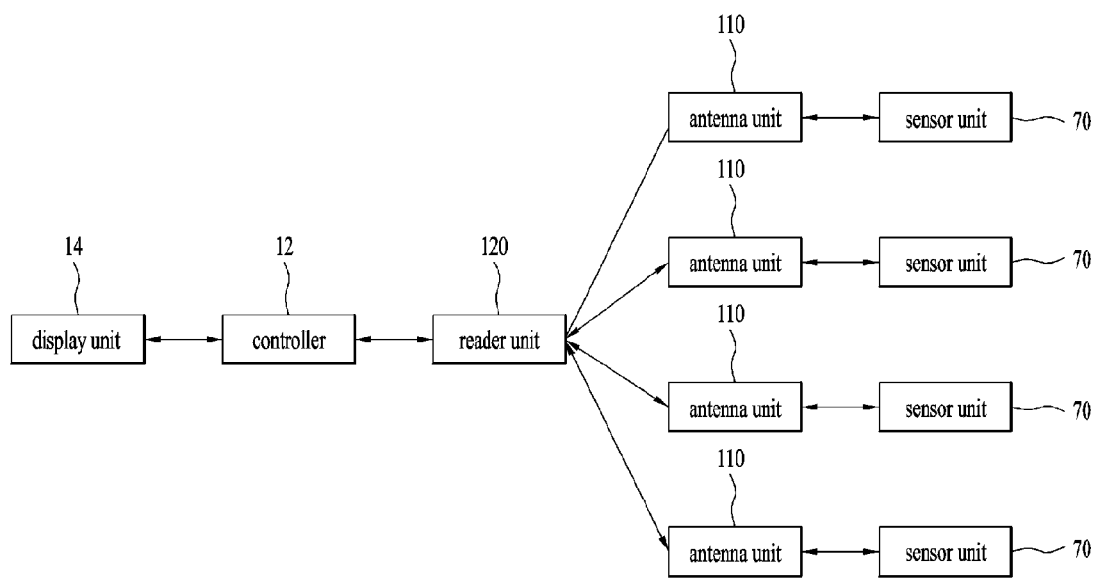

[Fig. 6]
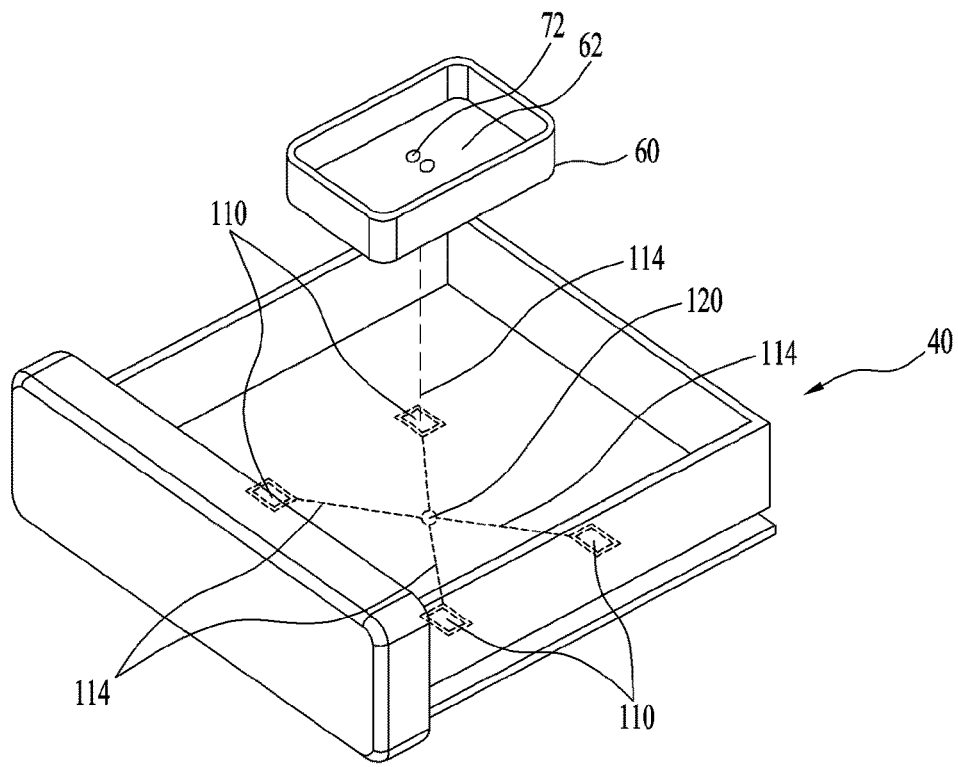
[Fig. 7]
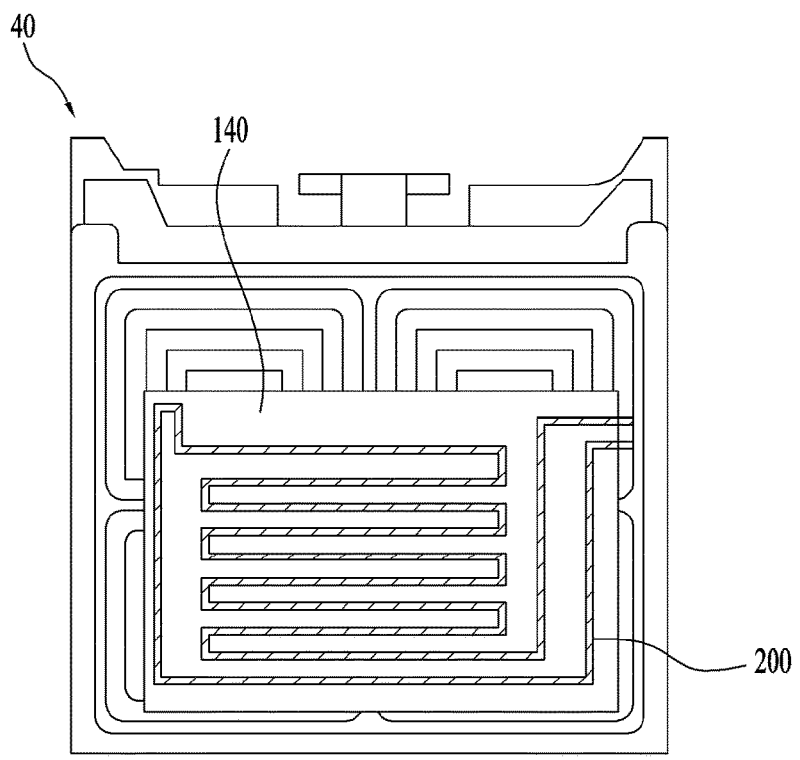

[Fig. 8]
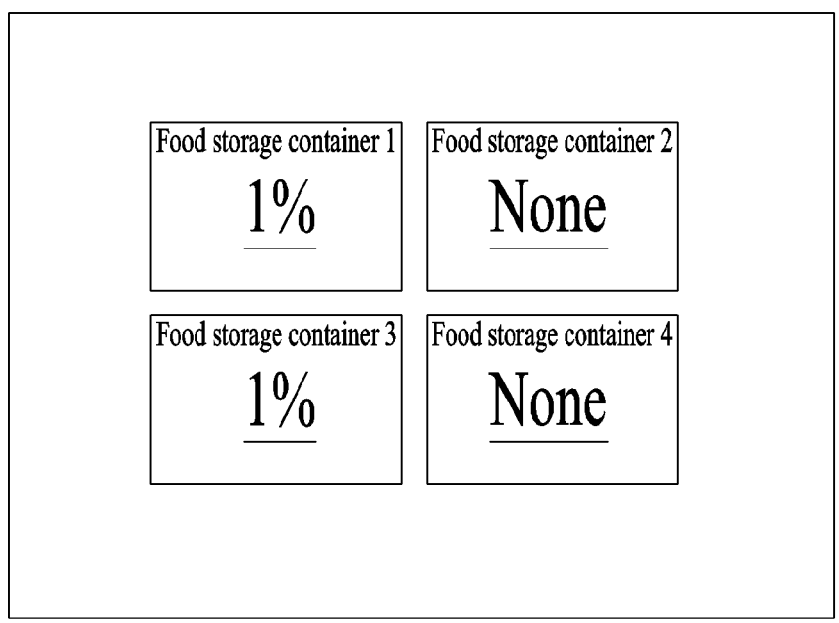

REFRIGERATOR

CROSS-REFERENCE TO RELATED APPLICATIONS

This application is a National Stage application under 35 U.S.C. § 371 of International Application No. PCT/KR2018/005733, filed on May 18, 2018, which claims the benefit of Korean Application No. 10-2017-0074562, filed on Jun. 14, 2017. The disclosures of the prior applications are incorporated by reference in their entirety.

TECHNICAL FIELD

The present application relates to a refrigerator, and more particularly, to a refrigerator that may acquire information on food respectively stored in a plurality of storage containers received in one storage compartment.

BACKGROUND

A refrigerator may include a machine compartment below a main body. For example, the machine compartment may be located below the refrigerator in consideration of a center of gravity of the refrigerator, assembly efficiency, and vibration attenuation.

In some cases, a cooling cycle device may be provided in the machine compartment of the refrigerator, and maintain the inside of the refrigerator at a frozen/refrigerating state by absorbing external heat while changing a liquid refrigerant of a low pressure to a gaseous refrigerant to thereby keep food in a fresh state. The cooling cycle device of the refrigerator may include a compressor for changing a gaseous refrigerant of low temperature and low pressure to a gaseous refrigerant of high temperature and high pressure, a condenser for changing the gaseous refrigerant of high temperature and high pressure changed by the compressor to a liquid refrigerant of high temperature and high pressure, and an evaporator for absorbing external heat while changing the liquid refrigerant of low temperature and high pressure changed by the condenser to a gaseous refrigerant.

Various types of food may be stored in a storage compartment of the refrigerator. Each food type may be kept in a plurality of storage containers that are individually partitioned. For example, if kimchi is being kept in a storage container, a user may be informed of information about the kimchi.

SUMMARY

The present disclosure describes a refrigerator that is configured to provide a user with information related to food kept individually in a plurality of storage containers.

The present disclosure also describes a refrigerator that may reduce the cost of parts used when information on a plurality of storage containers is acquired.

According to one aspect of the subject matter described in this application, a refrigerator includes a cabinet that defines a storage compartment, a plurality of food storage containers configured to be received in the storage compartment and disposed vertically above a bottom surface of the storage compartment, a plurality of sensor units, each of which is disposed at a lower surface of one of the plurality of food storage containers; a plurality of antenna units disposed at the bottom surface of the storage compartment, each of the plurality of antenna units corresponding to one of the plurality of sensor units; and a reader unit configured to receive signals transmitted from the plurality of antenna units. The bottom surface of the storage compartment partitions a lower portion of the storage compartment, and the sensor units include a salinity sensor configured to measure a salinity inside of the food storage containers and transmit the salinity to one or more of the plurality of antenna units.

Implementations according to this aspect may include one or more of the following features. For example, an area of the bottom surface of the storage compartment may be greater than an area of the lower surface of one or more of the food storage containers, and the plurality of food storage containers are configured to be mounted on the bottom surface of the storage compartment. In some examples, a number of the plurality of antenna units may be equal to a number of the food storage containers that are mounted on the bottom surface of the storage compartment. In some implementations, the area of the bottom surface of the storage compartment may be greater than or equal to an area of four of the food storage containers.

In some implementations, each antenna unit of the plurality of antenna units may be configured to perform a wireless communication with one or more of the plurality of sensor units disposed in a range from the antenna unit. In some examples, the plurality of sensor units include a near field communication (NFC) tag.

In some implementations, the reader unit may be connected to the plurality of antenna units by a cable, and the plurality of antenna units are configured to perform communication with the reader unit through the cable. In some implementations, the plurality of antenna units may be arranged vertically below the bottom surface of the storage compartment and not exposed to the storage compartment.

In some implementations, the refrigerator may further include a heater configured to provide heat to the storage compartment to thereby increase a temperature of the storage compartment. In some implementations, the refrigerator may further include a ferrite sheet arranged between the heater and the plurality of antenna units. In some examples, the heater may be arranged vertically below the bottom surface of the storage compartment and extend along a line including one or more turns. In some examples, the ferrite sheet may define one plane that covers an entire area of an upper side of the heater.

In some implementations, the salinity sensor may be partially exposed to an inside of the food storage containers. In some implementations, the refrigerator may further include a display unit configured to display information about the refrigerator. In some examples, the display unit may be further configured to display information about the salinity sensed by each sensor unit corresponding to each of the plurality of food storage containers.

In some implementations, the storage compartment may include a first storage compartment, a second storage compartment disposed vertically below the first storage compartment, and a third storage compartment disposed vertically below the second storage compartment, where the food storage containers are configured to be received in the second storage compartment.

In some implementations, the refrigerator may further include a drawer configured to be inserted into and ejected from the second storage compartment. In some implementations, the refrigerator may further include a door configured to open and close the second storage compartment, where the drawer is configured to move together with the door.

In some implementations, the drawer may be one drawer of the refrigerator, and the plurality of food storage containers may be configured to be received in the one drawer. In some implementations, the plurality of sensor units may be configured to be positioned vertically above the plurality of antenna units based on the drawer being inserted into the second storage compartment.

In some implementations, information on food individually kept in one storage compartment may be provided to a user. Therefore, the user may acquire information on food without opening food storage containers individually.

In some implementations, one reader unit may be shared in acquiring information transmitted from a plurality of food storage containers, and thus the number of parts may be reduced, whereby the cost for manufacturing a refrigerator may be reduced.

In some implementations, where a heater is provided in the storage compartment, a radio interference caused by the heater may be blocked, and information on food may stably be transmitted and received.

BRIEF DESCRIPTION OF DRAWINGS

FIG. 1 is a front sectional view illustrating examples parts of an example refrigerator.

FIG. 2 is a front sectional view illustrating an example storage compartment of FIG. 1.

FIG. 3 is a side sectional view illustrating an example drawer of FIG. 1 that is being inserted into a storage compartment.

FIG. 4 is a side sectional view illustrating an example drawer of FIG. 1 that is inserted into a storage compartment.

FIG. 5 is a control block diagram of an example according to the present disclosure.

FIG. 6 is a view illustrating example parts according to the present disclosure.

FIG. 7 is a view illustrating an example heater.

FIG. 8 is a view illustrating an example of a screen displayed on a display unit.

DETAILED DESCRIPTION

Reference will now be made in detail to the one or more implementations of the present disclosure, examples of which are illustrated in the accompanying drawings.

For clarification and convenience of description, size and shape of each element shown in the drawings may be enlarged or downsized. Also, the terms defined particularly considering elements and operation of the present disclosure may be modified depending on intention of a user or person skilled in the art or practices. These terms used herein should be understood not simply by the actual terms used but by the meaning lying within and the description disclosed herein.

FIG. 1 is a front sectional view illustrating example pars of an example refrigerator according to the present disclosure.

For convenience of description, although the present disclosure will be described based on a kimchi refrigerator that may receive food storage containers designed for storing kimchi, the present disclosure may be applied generally to all types of refrigerators. That is, the present disclosure is not limited to a kimchi refrigerator.

In some examples, a lid type kimchi refrigerator may include a lid arranged on the top and configured to maintain the cooling air. A drawer type kimchi refrigerator may include a drawer in which a user may arrange food storage containers conveniently and neatly and use upper and side spaces conveniently. In some examples, a combined type kimchi refrigerator may include a lid on the top and a drawer on the bottom. The present disclosure may be applied to all of the drawer type kimchi refrigerator, the lid type kimchi refrigerator, and the combined type kimchi refrigerator.

In some implementations, the refrigerator may include a cabinet 10 that defines an external appearance, and a storage compartment 30 in which food is received is included in the cabinet 10. A plurality of storage compartments 30 may be formed in the cabinet 10. In this case, various types of food may be kept in the storage compartments 30 by varying a temperature and a temperature sustain time.

In some implementations, the refrigerator may include a drawer 40 that may be inserted into or ejected from the storage compartment 30. The drawer 40 may be smaller than the storage compartment 30, and may define a space in which food storage containers may be kept. Also, a sliding member such as wheel is provided on an outer side of the drawer 40 to enable the drawer 40 to be inserted into or ejected from the storage compartment 30 by being slid from the storage compartment 30.

In some implementations, the drawer 40 may accommodate a food storage container 60 in which food is stored individually. The food storage container 60 may have a material such as plastic. Kimchi containing water therein may be kept in the food storage container 60. In this case, the food storage container 60 is tightly sealed such that smell of kimchi and juice of kimchi may not leak out. Also, the food storage container 60 are provided with an opening and a lid, which opens or closes the opening, on the top to take out kimchi kept in the storage container 60.

The food storage container 60 is received in the drawer 40, and a plurality of food storage containers 60 may be received in one drawer 40. In this case, various kinds of kimchi may be kept in one drawer 40.

The refrigerator includes a controller 12 that may control the refrigerator and a display unit 14 that may provide a user with information on the refrigerator in the form of screen.

FIG. 2 is a front sectional view illustrating an example storage compartment of FIG. 1.

The storage compartment 30 may include a bottom surface 32 that defines a lower external appearance of the storage compartment. An upper space of the bottom surface 32 may refer to an inside of the storage compartment 30 configured to receive cool air and be cooled by the received cool air. A lower space of the bottom surface 32 may refer to an outside of the storage compartment 30, into which the cool air does not enter. The upper space of the bottom surface 32 and the lower space of the bottom surface 32 may be included in an inner space of the cabinet 10.

In some implementations, the refrigerator may include a plurality of food storage containers 60 that are individually partitioned to allow food to be individually stored therein and that are arranged in the storage compartment 30. In some examples, when viewed from a front side, two food storage containers 60 may be received at both sides.

In some implementations, the refrigerator may include a sensor unit 70 for sensing information on food, for example, information on kimchi. In some examples, the sensor unit 70 may be disposed at a lower surface 64 of the food storage container 60. The lower surface 64 may define a groove 62 to define an inner space that is upwardly recessed, and the sensor unit 70 may be received in the groove 62.

Since the groove 62 provides a space in which the sensor unit 70 may be received, the sensor unit 70 may be prevented from being damaged by colliding with the other part while the food storage container 60 is moving.

The sensor unit 70 may include a salinity sensor 74 that measures a salinity inside the food storage container 60.

The salinity sensor 74 may include an electrode unit 72 that may be exposed to the inner side of the food storage container 60 and be in contact with food, for example, kimchi. The electrode unit 72 may be arranged on the top of the salinity sensor 74. The electrode unit 72 may include a pair of electrodes (e.g., a plus pole and a minus pole) which are in connection with each other by being spaced apart from each other in juice of kimchi kept in the food storage container 60. A power source may be applied to the electrode unit 72 to measure electrical conductivity between both electrodes, and the salinity of kimchi may be measured based on the electrical conductivity. For example, when the electrical conductivity is relatively high with respect to a reference conductivity, a salinity of kimchi may have a great value, and if the electrical conductivity is relatively low, a salinity of kimchi may have a small value.

In some implementations, a near field communication (NFC) tag 76 may be installed below the salinity sensor 74. The power source may instantaneously be applied to the salinity sensor 74 through the NFC tag 76, whereby the conductivity may be measured by the salinity sensor 74 through the electrode unit 72. In some implementations, alternatively or in addition, other types of communication devices may be provided to the sensor unit 70. For instance, a radio frequency (RF) device, a light communication device using infrared light or visible light, WiFi device, Bluetooth device, etc. may be disposed within a vicinity of the salinity sensor 74. In some cases, such communication devices may contact the sensor unit 70.

In some implementations, the food storage container 60 may not include a device for storing the power, such as a battery, in the food storage container 60, and thus an event such as a power failure may be avoided, and a battery lifespan may not be considered in regard to the food storage container 60 or the sensor unit 70.

In some implementations, an antenna unit 110, which may perform wireless communication with each sensor unit 70, may be located below the bottom surface 32 of the storage compartment 30 to correspond to each sensor unit 70. The antenna units 110 may include one or more antennas configured to perform wireless communication with the sensor unit 70. For example, the wireless communication may be performed through one or more communication protocols such as RF communication, NFC, Bluetooth, WiFi, Infrared communication, visible light communication, etc.

The antenna unit 110 may be arranged below the portion where the sensor unit 70 is located, when the drawer 40 is received in the storage compartment 30.

The antenna unit 110 may receive a signal transmitted from the sensor unit 70 in a wireless communication mode. Also, the antenna unit 110 may operate the NFC tag 76 to allow the salinity sensor 74 to measure salinity. Since the antenna unit 110 and the sensor unit 70 are spaced apart from each other, they may transmit and receive a signal to and from each other in a wireless communication mode.

In some implementations, where the antenna unit 110 is arranged below the bottom surface 32, the antenna unit 110 may not be exposed to the storage compartment 30. Therefore, the user may not recognize the antenna unit 110 when the drawer 40 is inserted into or ejected from the storage compartment 30.

In some implementations, an empty space may exist between the antenna unit 110 and the sensor unit 70, and the bottom surface 32 of the storage compartment 30 may be positioned between the antenna unit 110 and the sensor unit 70.

A ferrite sheet 140 and a heater 200 are sequentially arranged below the antenna unit 110. A space may exist between the ferrite sheet 140 and the heater 200.

The heater 200 may supply heat to the storage compartment 30. If kimchi is kept in the storage compartment 30, an operation for ripening kimchi may be performed. In this case, heat generated from the heater 200 may be supplied to the storage compartment 30 to increase a temperature of the storage compartment 30.

The heater 200 may be made of a metal material. In some cases, an interference to wireless communication between the antenna unit 110 and the sensor unit 70 may be generated by the heater 200, which may lead to an occurrence of a communication failure. In some cases, power supply and data transmission and reception may be performed in the sensor unit 70 and the antenna unit 110 through wireless communication using NFC. In this case, a peripheral conductor (e.g., metal) may aggravate loss by changing a magnetic resonance frequency of a coil, and may generate a communication failure by lowering inductance of a coil.

In some implementations, to help avoid such a communication failure, the ferrite sheet 140 may be arranged below the antenna unit 110. The ferrite sheet 140 may be made of ferrite oxide based ceramics, and NiZn based ferrite or MnZn based ferrite may be used as the ferrite sheet 140. Communication failure may be generated by various metal structures arranged in the cabinet 10 in addition to the heater 200. Since the ferrite sheet 140 is arranged below the antenna unit 110, communication failure may be reduced.

FIG. 3 is a side sectional view illustrating a state that an example drawer of FIG. 1 is being inserted into a storage compartment, and FIG. 4 is a side sectional view illustrating a state after an example drawer of FIG. 1 is inserted into a storage compartment.

The user may put the food storage container 60 into the drawer 40 in a state that the drawer 40 is ejected as shown in FIG. 3 and then insert the drawer 40 into the storage compartment 40 as shown in FIG. 4.

In some implementations, two food storage containers 60 may be arranged in the drawer 40 in a direction that the drawer 40 is ejected or inserted.

Since the sensor unit 70 is arranged above the antenna unit 110 after the drawer 40 is sufficiently inserted into the storage compartment 30 as shown in FIG. 4, a distance between the sensor unit 70 and the antenna unit 110 becomes short, whereby wireless communication may be performed.

FIG. 5 is a control block diagram of one implementation, and FIG. 6 is a view illustrating a main part of the present disclosure. The antenna unit 110 is shown in FIG. 6 on the assumption that the drawer 40 is inserted into the storage compartment 30.

In some implementations, as shown in FIG. 5, the number of the antenna units 110 is the same as the number of the sensor units 70 arranged on the bottom surface 32. Each antenna unit 110 performs power supply and data transmission and reception with each sensor unit 70 in a wireless communication mode. The antenna units 110 correspond to the sensor units 70 one to one, whereby one antenna unit 110 performs wireless communication with one sensor unit 70. The plurality of antenna units 110 are connected to one reader unit 120 through a wire 114 in a cable mode. The reader unit 120 may receive a signal from the plurality of antenna units 110 and then transfer the signal to the controller 12.

In some implementations, only one reader unit 120 may be provided, and may be connected to all of the antenna units 110, whereby the reader unit 120 may sequentially receive the signals transferred from the respective antenna units 110. The reader unit 120 may individually be connected to each antenna unit 110 through an individual wire 114.

The reader unit 120 may perform communication with the plurality of antenna units 110 through the wire 113 in a cable mode.

The reader unit 120 may include a circuit unit that controls data processing. The antenna units 110 may be driven sequentially, whereby the sensor units 70 corresponding to the antenna units 110 may be driven sequentially. The antenna units 110 may be driven clockwise or counterclockwise.

The bottom of the drawer 40 may have the substantially same area as that of the bottom surface 32 of the storage compartment 30. The plurality of food storage containers 60 may be mounted on the drawer 40, wherein four food storage containers 60 may be received in the drawer 40. Therefore, four food storage containers 60 are equally arranged on the bottom surface 32 of the storage compartment 30. The food storage containers 60 may be arranged in such a manner that two food storage containers are arranged in a left and right direction and two other food storage containers are arranged in a forward and backward direction.

That is, the bottom surface 32 of the storage compartment 30 may have an area where four food storage containers 60 may be arranged.

FIG. 7 is a view illustrating an example heater and an example position of the heater.

In some implementations, the heater 200 may be arranged to be extended from the lower portion of the storage compartment 30 in a zigzag shape. That is, the shape of the heater 200 may include one or more turns. In some examples, the heater 200 may be arranged at various positions below the storage compartment 30 to uniformly heat the inside of the storage compartment 30. For example, the heater 200 may be arranged below the storage compartment 30 while being extended in a forward and backward direction and extended in a left and right direction.

The ferrite sheet 140 may be arranged to fully cover the upper side to which the heater 200 is extended, while forming one plane. For example, the ferrite sheet 140 may be arranged between the heater 200 and the drawer 40, and below the drawer 40 to cover the heater 200 such that the heater 200 is not exposed directly to the storage compartment.

FIG. 8 is a view illustrating an example a screen displayed on a display unit.

In some implementations, a salinity of each food storage container may be displayed on the display unit 14 as shown in FIG. 8. For example, when each of the food storage container 60 accommodates kimchi, the user may determine a storage period of kimchi through the measured salinity of kimchi.

In some implementations, the storage compartment may include a first storage compartment provided at the uppermost side, a second storage compartment provided below the first storage compartment, and a third storage compartment provided below the second storage compartment. Since the storage compartment is divided into three areas, various kinds of food may be kept separately from one another.

In some implementations, the food storage container may be received in the second storage compartment. If kimchi is kept in the food storage container, kimchi contains water and thus is relatively thicker than the other food. The user may most conveniently insert or eject the food storage container into or from the second storage compartment, which corresponds to a middle height as compared with the first storage compartment which is the highest and the third storage compartment which is the lowest.

In some implementations, the drawer may move together with a door which opens or closes the second storage compartment. One drawer is provided, and the plurality of food storage containers are received in one drawer. If the drawer is fully received in the second storage compartment, the sensor unit may be arranged above the antenna unit, whereby the antenna unit and the sensor unit may transmit and receive a signal to and from each other.

It will be apparent to those skilled in the art that the present disclosure may be implemented in other specific forms without departing from the spirit and essential characteristics of the disclosure. Thus, the above implementations are to be considered in all respects as illustrative and not restrictive. The scope of the disclosure should be determined by reasonable interpretation of the appended claims and all change which comes within the equivalent scope of the disclosure are included in the scope of the disclosure.

The invention claimed is:

1. A refrigerator comprising:
   a cabinet that defines a storage compartment;
   a plurality of food storage containers configured to be received in the storage compartment and disposed vertically above a bottom surface of the storage compartment;
   a plurality of sensor units, each of the plurality of sensor units being disposed at a lower surface of one of the plurality of food storage containers;
   a plurality of antenna units disposed at the bottom surface of the storage compartment, each of the plurality of antenna units corresponding to one of the plurality of sensor units;
   a ferrite sheet arranged below the plurality of antenna units; and
   a reader unit configured to receive signals transmitted from the plurality of antenna units,
   wherein the bottom surface of the storage compartment partitions a lower portion of the storage compartment, and
   wherein the sensor units include a salinity sensor configured to measure a salinity inside of the food storage containers and transmit the salinity to one or more of the plurality of antenna units.

2. The refrigerator according to claim 1, wherein an area of the bottom surface of the storage compartment is greater than an area of the lower surface of one or more of the food storage containers, and the plurality of food storage containers are configured to be mounted on the bottom surface of the storage compartment.

3. The refrigerator according to claim 2, wherein a number of the plurality of antenna units is equal to a number of the food storage containers that are mounted on the bottom surface of the storage compartment.

4. The refrigerator according to claim 2, wherein the area of the bottom surface of the storage compartment is greater than or equal to an area of four of the food storage containers.

5. The refrigerator according to claim 1, wherein each said antenna unit of the plurality of antenna units is configured to perform a wireless communication with one or more of the plurality of sensor units disposed in a range of said antenna unit.

6. The refrigerator according to claim 5, wherein the plurality of sensor units include a near field communication (NFC) tag.

7. The refrigerator according to claim 1, wherein the reader unit is connected to the plurality of antenna units by a cable, and the plurality of antenna units are configured to perform communication with the reader unit through the cable.

8. The refrigerator according to claim 1, wherein the plurality of antenna units are arranged vertically below the bottom surface of the storage compartment and are not exposed to the storage compartment.

9. The refrigerator according to claim 8, further comprising a heater configured to provide heat to the storage compartment to thereby increase a temperature of the storage compartment.

10. The refrigerator according to claim 9, wherein the ferrite sheet is arranged between the heater and the plurality of antenna units.

11. The refrigerator according to claim 10, wherein the heater is arranged vertically below the bottom surface of the storage compartment and extends along a line including one or more turns.

12. The refrigerator according to claim 11, wherein the ferrite sheet defines one plane that covers an entire area of an upper side of the heater.

13. The refrigerator according to claim 1, wherein the salinity sensor is partially exposed to an inside of the food storage containers.

14. The refrigerator according to claim 1, further comprising a display unit configured to display information about the refrigerator.

15. The refrigerator according to claim 14, wherein the display unit is further configured to display information about the salinity sensed by each said sensor unit corresponding to each of the plurality of food storage containers.

16. The refrigerator according to claim 1, wherein the storage compartment includes a first storage compartment, a second storage compartment disposed vertically below the first storage compartment, and a third storage compartment disposed vertically below the second storage compartment, and wherein the food storage containers are configured to be received in the second storage compartment.

17. The refrigerator according to claim 16, further comprising a drawer configured to be inserted into and ejected from the second storage compartment.

18. The refrigerator according to claim 17, further comprising a door configured to open and close the second storage compartment, wherein the drawer is configured to move together with the door.

19. The refrigerator according to claim 17, wherein the drawer is one drawer of the refrigerator, and the plurality of food storage containers are configured to be received in the one drawer.

20. The refrigerator according to claim 17, wherein the plurality of sensor units are configured to be positioned vertically above the plurality of antenna units based on the drawer being inserted into the second storage compartment.

\* \* \* \* \*